(12) United States Patent
Ezell et al.

(10) Patent No.: US 8,697,609 B2
(45) Date of Patent: Apr. 15, 2014

(54) METHODS OF USING FLUID LOSS ADDITIVES COMPRISING MICRO GELS

(75) Inventors: Ryan G. Ezell, Spring, TX (US); Jun Jim Wu, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 103 days.

(21) Appl. No.: 13/051,077

(22) Filed: Mar. 18, 2011

(65) Prior Publication Data
US 2011/0168393 A1 Jul. 14, 2011

Related U.S. Application Data

(62) Division of application No. 12/418,323, filed on Apr. 3, 2009.

(51) Int. Cl.
| | | |
|---|---|---|
| *C09K 8/24* | (2006.01) | |
| *C09K 8/34* | (2006.01) | |
| *E21B 43/22* | (2006.01) | |
| *E21B 33/00* | (2006.01) | |

(52) U.S. Cl.
USPC ............ 507/117; 507/139; 166/282; 166/285

(58) Field of Classification Search
USPC .......... 507/117, 139, 239; 166/278, 300, 282, 166/285; 175/65
See application file for complete search history.

(56) References Cited

U.S. PATENT DOCUMENTS

| | | | | |
|---|---|---|---|---|
| 3,094,501 A | | 6/1963 | Wahl et al. | |
| 3,761,410 A | | 9/1973 | Mondshine et al. | |
| 3,784,585 A | * | 1/1974 | Schmitt | 525/445 |
| 4,076,768 A | * | 2/1978 | Saunders et al. | 525/98 |
| 4,142,595 A | | 3/1979 | Anderson et al. | |
| 4,182,417 A | * | 1/1980 | McDonald et al. | 166/295 |
| 4,387,769 A | * | 6/1983 | Erbstoesser et al. | 507/219 |
| 4,539,348 A | * | 9/1985 | Gajria et al. | 523/409 |
| 4,554,081 A | * | 11/1985 | Borchardt et al. | 507/121 |
| 4,567,246 A | | 1/1986 | Gajria et al. | |
| 5,829,527 A | * | 11/1998 | Ahmed et al. | 166/295 |

(Continued)

FOREIGN PATENT DOCUMENTS

| | | |
|---|---|---|
| CA | 2472090 A1 | 7/2003 |
| CA | 2614272 A1 | 1/2007 |
| EP | 2 414 479 | 10/2010 |
| GB | 2 278 359 A | 11/1994 |

OTHER PUBLICATIONS

Office Action for U.S. Appl. No. 12/418,323 dated May 13, 2011.

(Continued)

*Primary Examiner* — Aiqun Li
(74) *Attorney, Agent, or Firm* — McDermott Will & Emery LLP; Craig W. Roddy

(57) ABSTRACT

Methods and fluids are provided that include, but are not limited to, a drilling fluid comprising an aqueous base fluid and a fluid loss control additive that comprises at least one polymeric micro gel and a method comprising: providing an aqueous based treatment fluid comprising a fluid loss control additive that comprises at least one polymeric micro gel; placing the aqueous based treatment fluid in a subterranean formation via a well bore penetrating the subterranean formation; allowing the fluid loss control additive to become incorporated into a filter cake located on a surface within the subterranean formation; allowing the filter cake to be degraded; and producing hydrocarbons from the formation. Additional methods are also provided.

7 Claims, 2 Drawing Sheets

(56) References Cited

U.S. PATENT DOCUMENTS

| | | | |
|---|---|---|---|
| 5,962,068 A * | 10/1999 | Tsuchiya et al. | 427/180 |
| 6,103,671 A | 8/2000 | Dobson et al. | |
| 2004/0192561 A1 * | 9/2004 | Kippie et al. | 507/200 |
| 2004/0244978 A1 * | 12/2004 | Shaarpour | 166/293 |
| 2005/0169882 A1 | 8/2005 | Lowe et al. | |
| 2006/0032633 A1 * | 2/2006 | Nguyen | 166/280.2 |
| 2006/0193820 A1 | 8/2006 | Andrianov et al. | |
| 2007/0032386 A1 | 2/2007 | Abad et al. | |
| 2007/0277981 A1 * | 12/2007 | Robb et al. | 166/300 |
| 2008/0096774 A1 | 4/2008 | Tabary et al. | |
| 2008/0102276 A1 | 5/2008 | Khademhosseini et al. | |
| 2008/0135247 A1 | 6/2008 | Hutchins | |
| 2008/0142220 A1 | 6/2008 | Hoefer et al. | |
| 2008/0210428 A1 * | 9/2008 | Javora et al. | 166/312 |

OTHER PUBLICATIONS

Official Action for Canadian Patent Application No. 2,756,920 dated Oct. 3, 2012.

* cited by examiner

METHODS OF USING FLUID LOSS ADDITIVES COMPRISING MICRO GELS

CROSS REFERENCE TO RELATED APPLICATIONS

This application is a divisional of U.S. patent application Ser. No. 12/418,323 filed on Apr. 3, 2009, entitled "Methods of Using Fluid Loss Additives Comprising Micro Gels," by Ryan G. Ezell, et al. and published as U.S. 2010/0256018 A1, currently in prosecution, which is related to the entire disclosure of which is incorporated herein by reference.

BACKGROUND

The present invention relates to methods of using fluid loss control additives. More specifically, at least in some embodiments, the present invention relates to the use of fluid loss control additives in drilling and servicing fluids that comprise polymeric micro gels in subterranean operations.

When well bores are drilled into producing formations, drilling fluids are utilized which will minimize damage to the permeability of the formations and their ability to produce hydrocarbons. Servicing fluids are utilized when completion operations are conducted in producing formations and when conducting work-over operations in the formations. The drilling and servicing fluids deposit a layer of particles known as "filter cake" on the walls of the well bores within the producing formations. The filter cake is believed to help prevent the drilling and servicing fluids from being lost into the formation and prevents solids from entering the porosities of the rock. Following completion and prior to initiating production, the filter cake is usually degraded or allowed to degrade to allow product to flow into the well bore for production. Degrading the filter cake is important to retain well bore connectivity and the natural permeability of the reservoir rock. If not degraded or allowed to degrade, the filter cake could present an impediment to production, inter alia, by altering the permeability of the reservoir. Once the permeability of the reservoir has been diminished, it is seldom able to restore it to its original condition. These should be distinguished from the function of additives (sometimes termed in the art "relative permeability modifiers" or "RPMs") that are often used in conformance or fracturing fluids to permanently seal water influxes to hydrocarbon reservoir areas surrounding a well bore.

Drilling and servicing fluids (such as drill-in fluids) may comprise fluid loss control additives to further assist in preventing the drilling and servicing fluids from being lost into the formations. Drilling fluids are any of a number of fluids and mixtures of fluids and solids (as solid suspensions, mixtures and emulsions of liquids, gases and solids) used in operations to drill boreholes into the earth. Classifications of drilling fluids has been attempted in many ways, often producing more confusion than insight. One classification scheme, given here, is based only on the mud composition by singling out the component that clearly defines the function and performance of the fluid: (1) aqueous-based, (2) oil-based and (3) gaseous (pneumatic). Each category has a variety of subcategories that overlap each other considerably. Ideally, a drilling fluid is non-damaging to the formation, meaning that the fluid does not leave behind particulates, fines, etc. that negatively impact the permeability of the formation.

A drill-in fluid is a fluid designed for drilling through the reservoir section of a well bore in a subterranean formation. The reasons for using a specially designed fluid include, but are not necessarily limited to: (1) to drill the reservoir zone successfully, often a long, horizontal drain hole; (2) to minimize damage to and maximize production of exposed zones; and (3) to facilitate the well completion needed, which may include complicated procedures. A drill-in fluid often resembles a completion fluid in that it may comprise a brine, possibly bridging agents, and/or polymers.

The term "drilling fluid" as used herein refers generically to both drilling fluids and drill-in fluids unless otherwise specified.

Other types of treatment fluids that can utilize fluid loss control materials include, but are not limited to, pills (such as inside screen pills), which are fluids with a relatively small quantity (e.g., less than 200 bbl) of a special blend of drilling fluid to accomplish a specific task that the regular drilling fluid cannot perform. Examples include high-viscosity pills to help lift cuttings out of a vertical well bore, freshwater pills to dissolve encroaching salt formations, pipe-freeing pills to destroy filter cake and relieve differential sticking forces, and lost circulation material pills to plug a thief zone. Another example is a screen pill that may be useful in conjunction with a gravel pack operation.

Examples of conventional fluid loss control additives for water-based treatment fluids include nonionic water soluble polymers, such as starches, derivatized starches, gums, derivatized gums, and cellulosics. Fluid loss additives that include starches often vary in the ratio of amylose to amylopectin content, and may or may not be modified with a crosslinking agent such as epichlorohydrin. Also, natural starches may not be uniform in terms of quality and effectiveness. These cross-linked starches often do not have thermal stability at temperatures up to about 250° F., and at temperatures above 250° F., they can only effectively be used by increased loading the treatment fluid with the cross-linked starch, constantly replenishing the treatment fluid with the cross-linked starch, or using an oxygen scavenger in conjunction with the cross-linked starch. At temperatures above 300° F., even by the use of the above mentioned measures, cross-linked starches may not be effective fluid loss control additives.

Conventional linear synthetic polymers are also utilized, but oftentimes, they require another additive, such as a clay, to be able to effectively function as fluid loss control additives. However, the use of clay can be problematic in drill-in fluids, as removing the clay from the subterranean formation can be difficult because it infiltrates into pores of the subterranean formation. Furthermore, the addition of clay to a treatment fluid dramatically increases the viscosity of the fluid, which can cause drilling to be completed at a reduced rate. Another issue is that some synthetic polymers cannot be used successfully in conjunction with some brines, for instance, divalent brines. This brine incompatibility is thought to prevent the synthetic polymer from associating with the clay to forming bridging colloids, which are desirable because they provide a degree of fluid loss, e.g., in a drill-in fluid.

SUMMARY

The present invention relates to methods of using fluid loss control additives. More specifically, at least in some embodiments, the present invention relates to the use of fluid loss control additives in drilling and servicing fluids that comprise polymeric micro gels in subterranean operations.

In one embodiment, the present invention provides a drilling fluid comprising an aqueous base fluid and a fluid loss control additive that comprises at least one polymeric micro gel.

In another embodiment, the present invention provides a method comprising: providing an aqueous based treatment fluid comprising a fluid loss control additive that comprises at least one polymeric micro gel; placing the aqueous based treatment fluid in a subterranean formation via a well bore penetrating the subterranean formation; allowing the fluid loss control additive to become incorporated into a filter cake located on a surface within the subterranean formation; allowing the filter cake to be degraded; and producing hydrocarbons from the formation.

In another embodiment, the present invention provides a method comprising: providing a drilling fluid comprising an aqueous base fluid and a fluid loss control additive that comprises at least one polymeric micro gel; circulating the drilling fluid in a subterranean formation; allowing the fluid loss control additive to become incorporated into a filter cake located on a surface within the subterranean formation; allowing the filter cake to be degraded; and producing hydrocarbons from the formation.

In another embodiment, the present invention provides a method comprising: providing an inside screen pill comprising an aqueous base fluid and a fluid loss control additive that comprises at least one polymeric micro gel, and placing the inside screen pill in a subterranean formation so that the inside screen pill is located between a gravel pack screen and an area of the subterranean formation.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF THE PREFERRED EMBODIMENTS

Figure 1:
FIG. 1 is a photograph of a transparent solution of a micro gel dispersion after dissolving in water.

The present invention relates to methods of using fluid loss control additives. More specifically, at least in some embodiments, the present invention relates to the use of fluid loss control additives in drilling and servicing fluids that comprise polymeric micro gels in subterranean operations.

There may be several potential advantages to the methods and compositions of the present invention, only some of which are alluded to herein. The present application provides drilling fluids, preferably for use as a drilling, drill-in, completion fluid or pills, which quickly forms a thin, degradable filter cake. Again, for the sake of clarity, the term "drilling fluid" as used herein refers generically to both drilling fluids and drill-in fluids unless otherwise specified. The drilling fluids of the present invention are less invasive to the formation yet provide lubricity, effective fluid loss control, and good filter cake sealing and plastering characteristics. The resulting filter cake can be easily lifted off and readily removed or dissolved to help ensure low skin and residual damage. Moreover, the fluids are stable for prolonged periods of time at high temperatures. In particular, the drilling fluids of the present invention are believed to have enhanced performance over conventional fluids that comprise starch derivatives, for instance, because they can be used at effective static bottom hole temperatures up to at least about 400° F. or more while maintaining effective fluid loss control, thus minimizing formation damage. In doing so, a vast range of applications is open for technological advancement and new product revenue. It is believed that in equal concentrations, the drilling fluids of the present invention that comprise fluid loss additives comprising polymeric micro gels described herein give an increased performance (e.g., an order of magnitude increase) in the amount of fluid loss over starch-based fluid loss materials.

Another potential advantage may be that the drilling fluids of the present invention may be used without the addition of clay, which allows for easier clean up, minimal formation damage, faster drilling times, and the avoidance of problems associated with the increased viscosity of fluids when clay is added.

In some embodiments, the present invention provides an aqueous-based drilling fluid that comprises a fluid loss control additive of the present invention that comprises at least one polymeric micro gel. In other embodiments, the present invention provides drilling fluids that comprise an aqueous base fluid (e.g., a brine or fresh water), and one or more fluid loss control additives that comprise at least one polymeric micro gel. In practical usage, with respect to building a filter cake that will easily degrade, it may be beneficial to include bridging agents in the drilling fluid that will become incorporated into the filter cake. Without the bridging agents, the polymeric micro gels may form an effective filter cake, but that filter cake may be more difficult to remove. Other components of the drilling fluid may comprise weighting agents, clays, polymers, as well as other additives common to aqueous-based drilling fluids including, but not necessarily limited to, lubricants, corrosion inhibitors, other inhibitors, and oxygen scavengers.

In some embodiments, the fluid loss control additive may be included in the drilling fluid in an amount of about 5% or below by weight of active component of the polymeric micro gel.

The base fluid of the drilling fluids of the present invention may be any suitable aqueous-based fluid including, but not necessarily limited to, brines (i.e., water comprising a salt). In some instances, brines having a density of at least about 9 lb/gal, referred to as "high density brines," may be suitable. The brines may contain substantially any suitable salts, including, but not necessarily limited to, salts based on metals, such as calcium, magnesium, sodium, potassium, cesium, zinc, aluminum, and lithium. Salts of calcium and zinc are preferred. The salts may contain substantially any anions, with preferred anions being less expensive anions including, but not necessarily limited to chlorides, bromides, formates, acetates, and nitrates. Generally, the base fluid is present in a drilling fluid of the present invention in an amount in the range of from about 35% to about 97% by weight thereof, more preferably from about 70% to about 95% or more.

Preferably, when used, the bridging agents are either self-degrading or degradable in a suitable clean-up solution (e.g., a mutual solvent, water, an acid solution, etc.). Examples of bridging agents suitable for use in the methods of the current invention include, but are not necessarily limited to, magnesium citrate, calcium citrate, calcium succinate, calcium maleate, calcium tartrate, magnesium tartrate, bismuth citrate, calcium carbonate, sodium chloride and other salts, and the hydrates thereof. Examples of degradable bridging agents may include, but are not necessarily limited to, bridging agents comprising degradable materials such as degradable polymers. A polymer is considered to be "degradable" herein if the degradation is due to, inter alia, chemical and/or radical process such as hydrolysis, oxidation, enzymatic degradation, or UV radiation. Suitable examples of degradable polymers that may be used in accordance with the present invention include, but are not necessarily limited to, those described in the publication of Advances in Polymer Science, Vol. 157 entitled "Degradable Aliphatic Polyesters" edited by A. C. Albertsson, the disclosure of which is hereby incorporated by reference. Specific examples of suitable polymers include, but are not necessarily limited to, polysaccharides such as dextrans or celluloses; chitins; chitosans; proteins; orthoesters; aliphatic polyesters; poly(lactides); poly(glycolides); poly(ε-caprolactones); poly(hydroxybutyrates); poly(anhydrides); aliphatic polycarbonates; poly(orthoesters); poly(amino acids); poly(ethylene oxides); and polyphosphazenes. Combinations and derivatives of these are suitable as well.

When choosing a particular bridging agent to use, one should be aware of the performance of that bridging agent at the temperature range of the application. The bridging agents utilized may be generally present in the drilling fluid compositions in an amount in the range of from about 1% to about 40% by weight thereof, more preferably from about 5% to about 25%. Generally, the bridging agents may have a particle size in the range of from about 1 micron to about 600 microns. Preferably, the bridging particle size is in the range of from about 1 to about 200 microns but may vary from formation to formation. The particle size used is determined by the pore throat size of the formation.

The term "polymeric micro gel" as used herein refers to a gelled particle comprising a cross-linked polymer (e.g., water-soluble and water-swellable) network. In some embodiments, the fluid loss control additive may be delivered in a continuous medium, e.g., in a dispersion form. In other embodiments, the polymeric micro gels may be used without any continuous medium, e.g., in dry form. One of the many useful features of certain embodiments of the polymeric micro gels of the present invention is that they are believed to swell or shrink in response to an external stimuli, e.g., pH and temperature. In some embodiments, some of the polymeric micro gels may be considered to be super absorbent in that they can contain over 99% water. This may be advantageous in some applications wherein water absorbance is important.

When comprising a substantial portion of the fluid loss control additive in a drilling fluid of the present invention, the polymeric micro gels optionally may be dispersed in a continuous medium before addition to the fluid. In some embodiments, the fluid loss control additive may comprise a continuous medium. Examples of suitable continuous mediums may include, but are not necessarily limited to, aqueous-based fluids, alcohols, glycerin, glycols, polyglycol amines, polyols, and any derivative thereof. Additionally, in some embodiments, the continuous medium may comprise a fluid selected from the group consisting of methanol, ethanol, n-propanol, isopropanol, n-butanol, sec-butanol, isobutanol, t-butanol, a mixture of methanol, ethanol, n-propanol, isopropanol, n-butanol, sec-butanol, isobutanol, or t-butanol and water, a mixture of ammonium sulfate, sodium sulfate, or potassium sulfate and water, a mixture of sodium chloride, potassium chloride, or calcium chloride and water, and combinations thereof. Optionally, the continuous medium comprises a fluid selected from the group consisting of ethanol, a mixture of t-butanol and water, and a mixture of ammonium sulfate and water. Mixtures of these may be suitable as well. Examples of suitable aqueous-based fluids may include, but are not necessarily limited to, fresh water, sea water, salt water, and brines (e.g., saturated salt waters). Examples of suitable brines may include, but are not necessarily limited to, heavy brines, monovalent brines, divalent brines, and trivalent brines that comprise a soluble salts like sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, potassium carbonate, any combination thereof, and any derivative thereof. Examples of suitable alcohols may include, but are not necessarily limited to, methanol, ethanol, propanol, isopropanol, butanol, tert-butanol, and the like. Examples of suitable glycols may include, but are not necessarily limited to, polyglycols, propylene glycol, ethylene glycol, and the like. In some embodiments, the continuous medium may be present in any suitable range including ratios of continuous medium to polymeric micro gel of about 30:70, about 20:80, about 10:90, about 5:95, and about 0:100 by weight.

In some embodiments, the polymeric micro gels may comprise a reaction product formed by a suitable polymerization reaction of a polymer (or monomer) and a crosslinking agent. In one embodiment of a method of forming the micro gels of the present invention, the polymerization is a dispersion polymerization in a continuous medium that is substantially inert toward chain transfer reactions. Crosslinked polymer micro gel particles are formed, which are believed to be insoluble or at most swellable in the continuous medium. While not wishing to be limited to any particular theory, it is believed that in some embodiments, the crosslinking agent may act as an initiator forming chain branches of the polymer or monomer, which in turn may react with one another to form a polymeric micro gel. Other suitable initiators may include those known to those skilled in the art such as photoinitiators, thermal initiators, and combinations thereof.

In some embodiments, the polymer (or monomer) may comprise any suitable polymer or monomer that can form a polymeric micro gel when crosslinked. Suitable polymers and monomers may include, but are not necessarily limited to, those that comprise units based on acrylamides, vinyl alcohols, vinylpyrrolidones, vinylpyridines, acrylates, polyacrylamides, polyvinyl alcohols, polyvinylpyrrolidones, polyvinylpyridines, polyacrylates, polybutylene succinate, polybutylene succinate-co-adipate, polyhydroxybutyrate-valerate, polyhydroxybutyrate-covalerate, polycaprolactones, polyester amides, polyethylene terephthalates, sulfonated polyethylene terephthalate, polyethylene oxides, polyethylenes, polypropylenes, aliphatic aromatic polyoyester, polyacrylic acids, polysaccharides (such as dextran or cellulose), chitins, chitosans, proteins, aliphatic polyesters, polylactic acids, poly(glycolides), poly(ε-caprolactones), poly(hydroxy ester ethers), poly(hydroxybutyrates), poly(anhydrides), polycarbonates, poly(orthoesters), poly(amino acids), poly(ethylene oxides), poly(propylene oxides), poly (phosphazenes), polyester amides, polyamides, polystyrenes, any derivative thereof, any copolymer, homopolymer, or terpolymer, or any blend thereof. In some embodiments, the monomer may include an unsaturated group, such as a monomer including a vinyl group. Exemplary vinyl-containing monomers may be described by the formula $C(R_1)(R_2)\!=\!C(R_3)(R_4)$, wherein $R_1$, $R_2$, $R_3$ and $R_4$ are segments rendering the solubility or swellability of this monomer in the common solvent. Optionally, $R_1$, $R_2$, $R_3$ and $R_4$ can each be independently selected from, but not limited to, hydrogen, methyl, ethyl, $CONH_2$, $CONHCH_3$, $CON(CH_3)_2$, $CH_2SO_3H$, $CH_2SO_3Na$ and $COONa$. In a further option, the monomer comprises a compound selected from the group consisting of hydroxyethyl acrylate, acrylamide and hydroxyethyl methacrylate. Examples of suitable copolymers that may be used with these may include inorganic and organic polymers.

Some of these polymers and monomers may be more suited for less high temperature applications than others; however, crosslinking may increase their thermal stability. In some embodiments the polymer or monomer may comprise a water soluble polymer or monomer. In some embodiments the polymer or monomer may comprise a block copolymer with a portion that is water soluble and a portion that is water insoluble.

In some embodiments, the crosslinking agent may comprise any crosslinking agent that can react with a polymer or monomer to form a polymeric micro gel. In some embodiments, the crosslinking agent may comprise a covalent crosslinking agent. Examples of suitable crosslinking agents may include crosslinking agents that form a radical. Suitable crosslinking agents may include, but are not limited to, 2,2'-azobis-(2-methylbutyronitrile), 2,2'-azobis(isobutyramidine hydrochloride), 2,2'-azobis[2-(2-imidazolin-2-yl)propane] dihydrochloride, 1,1'-azobis(cyclohexanecarbonitrile), 2,2'-azobis(2-methylpropionamidine)dihydrochloride, 4,4'-azobis(4-cyanovaleric acid), ammonium persulfate, hydroxymethanesulfinic acid monosodium salt dihydrate, potassium persulfate, sodium persulfate, benzoyl peroxide, 1,1-bis(tert-amylperoxy)cyclohexane, 1,1-bis(tert-butylperoxy)cyclohexane, 2,2-bis(tert-butylperoxy)butane, 2,4-pentanedione peroxide, 2,5-bis(tert-butylperoxy)-2,5-dimethyl-hexane, 2,5-di(tert-butylperoxy)-2,5-dimethyl-3-hexyne; 2-butanone peroxide, cumene hydroperoxide, di-tert-amyl peroxide, dicumyl peroxide, lauroyl peroxide, tert-butyl hydroperoxide, tert-butyl peracetate, tert-butyl peroxide, tert-butyl peroxybenzoate, tert-butylperoxy-2-ethylhexyl carbonate, diethylene glycol dimethacrylate, azobisisobutyronitrile, and combinations thereof. A person of ordinary skill in the art would be able to select an appropriate crosslinking agent based upon the polymer or monomer to be crosslinked.

In some embodiments, the amount of crosslinking agent used in conjunction with the polymer or monomer may be any amount necessary to create the desired degree of crosslinking, and other characteristics. In some embodiments, the ratio of crosslinking agent to monomer or polymer used to form the polymeric micro gel may be in the range of from about 100:1 to about 5,000:1 by weight.

In one embodiment of a method of forming the micro gels of the present invention, the polymerization is a dispersion polymerization in a continuous medium such as a continuous medium comprising t-butyl alcohol/water and ammonium sulfate. Both the monomer (such as, but not limited to, acrylamide) and the crosslinking agent (such as, but not limited to, N,N'-ethylene-bis-acrylamide) are substantially soluble or at least swellable in the continuous medium. The resultant micro gels are not soluble in the continuous medium. The continuous medium is believed to be relatively inert (or at least not so reactive as to disrupt micro gels from forming) toward chain transfer reactions by propagating radicals. By removing the continuous medium using a suitable technique, the micro gels may be dried if desired.

Optionally, a colloidal stabilizer may also be included in the continuous medium during polymerization. One example of a colloidal stabilizer is amphiphilic, such as an amphiphilic colloidal stabilizer comprising a stabilizer selected from the group consisting of poly(vinyl pyrrolidone) (PVP), polydiallyldimethylammonium chloride (poly-DADMAC), and combinations thereof.

In one embodiment of a method of forming the micro gels of the present invention, the polymerization is a dispersion polymerization of water-soluble or swellable vinyl monomer(s) (as represented by C(R1)(R2)=C(R3)(R4), where R1, R2, R3 and R4 are segments rendering the solubility or swellability of this monomer to water and the polymerization medium) in the presence of radically polymerizable crosslinking agent (such as, but not limited to, C(R5)(R6)=C(R7)-R8-C(R9)=C(R10)(R11), where R5-R11 are groups rendering solubility and swellability of this crosslinking agent to water and the polymerization medium) in a medium (such as, but not limited to, t-butanol/water and ammonium sulfate solution in water), to which the chain transfer of propagating radical is avoided or suppressed. By taking advantage of the poor stability of the resultant dispersion at high polymer content (e.g., 13 wt %), in the absence of any crosslinking agent, the result may be one chunk of macro gel.

The size range for these polymeric micro gels may range from about 10 nm to about 1 mm in diameter. A suitable size range may be 10 microns to about 500 microns. In a given composition, a range of disparate sized polymeric micro gels may be used. One of ordinary skill in the art would be able to select an appropriate size of the polymeric micro gels based upon the characteristics of the subterranean formation in which the polymeric micro gels would be used, the temperature of the subterranean formation, the degree of stability required of the polymeric micro gels, and the costs. Also, the shapes of the polymeric micro gels may vary, and may depend on several factors including, but not necessarily limited to, temperature, the continuous medium used, and the degree of crosslinking. The polymeric micro gels can be any shape, for example, at least partially spherical. Depending on the method in which the polymeric micro gels are created, the shape of the polymeric micro gels can vary. One of ordinary skill in the art would be able to select an appropriate shape of the polymeric micro gels based upon the characteristics of the subterranean formation in which the polymeric micro gels would be used, the temperature of the subterranean formation, the degree of stability required of the polymeric micro gels, and the costs. No particular shape is critical for use in the present invention.

In some embodiments, the fluid loss control additives of the present invention may not be delivered with a continuous medium. These may be referred to as the "dry" embodiments. For example, in some embodiments, after the polymeric micro gels are polymerized, the polymeric micro gels may be removed from the continuous medium and then dried using a suitable technique to form the powdered polymeric micro gels.

In some embodiments, the present invention comprises an aqueous based drill-in fluid comprising a fluid loss control additive of the present invention that comprises at least one polymeric micro gel. In some embodiments, a fluid loss control additive may be included in the drill-in fluid in an amount of about 5% or below by weight of active component of the polymeric micro gel. Other components of the drill-in fluids may comprise bridging agents and other commonly used additives.

In some embodiments, the present invention comprises an inside screen pill comprising a water-based fluid and a fluid loss control additive comprising at least one polymeric micro gel. In some embodiments, fluid loss control additive may be included in the inside screen pill in an amount of about 1 to about 10% by weight of active component of the polymeric micro gel.

In some embodiments, the present invention provides a drilling fluid comprising an aqueous base fluid and a fluid loss control additive that comprises at least one polymeric micro gel.

In some embodiments, the present invention provides a method comprising: providing an aqueous based treatment fluid comprising a fluid loss control additive that comprises at least one polymeric micro gel; and placing the aqueous based treatment fluid in a subterranean formation via a well bore penetrating the subterranean formation.

In some embodiments, the present invention provides a method comprising: providing a drilling fluid comprising an aqueous base fluid and a fluid loss control additive that comprises at least one polymeric micro gel; and circulating the drilling fluid in a subterranean formation.

In some embodiments, the present invention provides a method comprising: providing an inside screen pill comprising an aqueous base fluid and a fluid loss control additive that comprises at least one polymeric micro gel, and placing the inside screen pill in a subterranean formation so that the inside screen pill is located between a gravel pack screen and an area of the subterranean formation.

To facilitate a better understanding of the present invention, the following examples of certain aspects of some embodiments are given. In no way should the following examples be read to limit, or define, the entire scope of the invention.

EXAMPLES

Example 1

Figure 2:
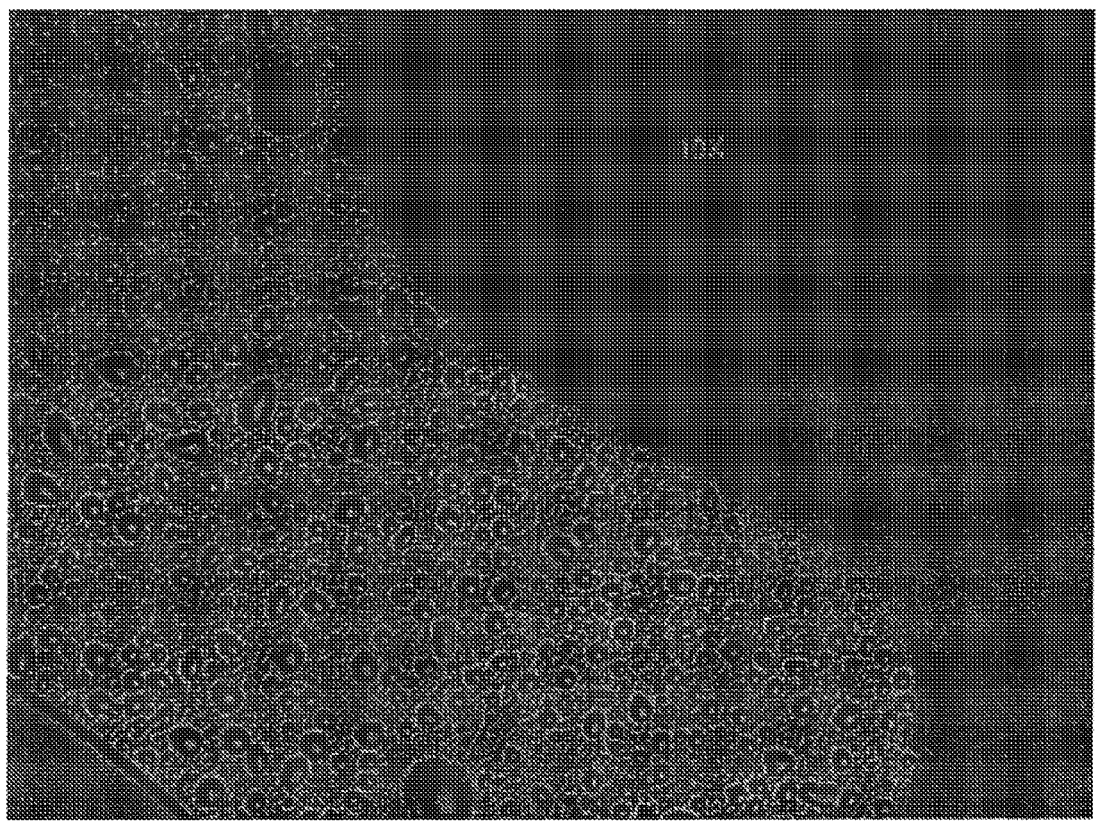
FIG. 2 is a micrograph of the micro gel dispersion of FIG. 1.

Polymeric micro gel particles were prepared in accordance with the following procedure. A mixture of 95.0 g of ethanol, 20.0 g of acrylamide, 0.50 g of poly(vinyl pyrrolidone), and 0.50 g of diethylene glycol dimethacrylate was prepared in a 250 mL three-neck flask equipped with a condenser and a mechanical stirrer. The mixture was purged with nitrogen gas for 30 minutes and then heated to 65° C. A 5.0 g solution of azobisisobutyronitrile in ethanol (1% azobisisobutyronitrile by weight) was then injected into the mixture. The mixture was then kept at 65° C. under nitrogen and stirred for 22 hours at 300 rpm. The mixture was then allowed to cool to room temperature and a dispersion of particles with sizes from 10 μm to 100 μm (in water) was obtained with solids content of approximately 17% by weight. FIG. 1 is a photograph of the transparent micro gel dispersion formed in this example. FIG. 2 is a micrograph of the micro gel dispersion formed in this example. The dispersions were then centrifuged at 4800 rpm for 5 minutes. The supernatant was then decanted and sediments were collected. The sediments were then derived under vacuum at approximately 50° C. overnight to generate loose, well dispersed dried powders.

Example 2

Polymeric micro gel particles were prepared in accordance with the following procedure. A mixture of 95.0 g of a mixture of t-butanol and water (90% t-butanol by weight), 15.0 g of acrylamide, 0.20 g of N,N'-ethylene-bis-acrylamide, and 0.50 g of poly(vinyl pyrrolidone) was prepared in a 250 mL three-neck flask equipped with a condenser and a mechanical stirrer. The mixture was purged with nitrogen gas for 30 minutes and then heated to 65° C. A 5.0 g solution of azobisisobutyronitrile in ethanol (1% azobisisobutyronitrile by weight) was then injected into the mixture. The mixture was then kept at 65° C. under nitrogen and stirred for 22 hours at 300 rpm. The mixture was then allowed to cool to room temperature and a dispersion of particles with sizes from 10 μm to 300 μm was obtained with a solids content of approximately 13% by weight.

Example 3

Polymeric micro gel particles were prepared in accordance with the following procedure. A mixture of 75.5 g of a 40% solution of ammonium sulfate in water, 7.5 g of acrylamide, 12.0 g of a 20% solution of polydiallyldimethylammonium chloride in water, 6.7 μL of poly(ethylene glycol)diacrylate, and 20.0 g of de-ionized water was prepared in a 250 mL three-neck flask equipped with a condenser and a mechanical stirrer. The mixture was purged with nitrogen gas for 30 minutes and then heated to 35° C. A 5.0 g solution of 2,2'-azobis[2-(2-imidazolin-2-yl)propane]dihydrochloride in water (0.01% 2,2'-azobis[2-(2-imidazolin-2-yl)propane]dihydrochloride by weight) was then injected into the mixture. The mixture was then kept at 35° C. under nitrogen and stirred for 22 hours at 300 rpm. The mixture was then allowed to cool to room temperature and a dispersion of particles with a solid content of approximately 9% by weight was obtained. The dispersions were then centrifuged at 4800 rpm for 5 minutes. The supernatant was then decanted and sediments were collected. The sediments were then derived under vacuum at approximately 50° C. overnight to generate loose, well dispersed dried powders.

Example 4

Polymeric micro gel particles were prepared in accordance with the following procedure. A mixture of 90.0 g of a mixture of t-butanol and water (90% t-butanol by weight), 15.0 g of acrylamide, 0.50 g of poly(vinyl pyrrolidone), was prepared in a 250 mL three-neck flask equipped with a condenser and a mechanical stirrer. The mixture was purged with nitrogen gas for 30 minutes and then heated to 65° C. A 5.0 g solution of azobisisobutyronitrile in ethanol (1% azobisisobutyronitrile by weight) was then injected into the mixture. After approximately 20 minutes a solution of 0.10 g of N,N'-ethylene-bis-acrylamide in 5.0 g of a mixture of t-butanol and water (90% t-butanol by weight) was injected into the mixture. The mixture was then kept at 65° C. under nitrogen and stirred for 22 hours at 300 rpm. The mixture was then allowed to cool to room temperature and a dispersion of particles with sizes from 10 μm to 300 μm was obtained with a solid content of approximately 13% by weight. The dispersions were then centrifuged at 4800 rpm for 5 minutes. The supernatant was then decanted and sediments were collected. The sediments were then dried under vacuum at approximately 50° C. overnight to generate loose, well dispersed dried powders.

Example 5

Polymeric micro gel particles were prepared in accordance with the following procedure. A mixture of 75.5 g of a 40% solution of ammonium sulfate in water, 7.5 g of acrylamide, 12.0 g of a 20% solution of polydiallyldimethylammonium chloride in water, 67 μl, of poly(ethylene glycol)diacrylate, and 20.0 g of de-ionized water was prepared in a 250 mL three-neck flask equipped with a condenser and a mechanical stirrer. The mixture was purged with nitrogen gas for 30 minutes and then heated to 35° C. A 5.0 g solution of 2,2'-azobis[2-(2-imidazolin-2-yl)propane]dihydrochloride in water (0.01% 2,2'-azobis[2-(2-imidazolin-2-yl)propane]dihydrochloride by weight) was then injected into the mixture. The mixture was then kept at 35° C. under nitrogen and stirred for 22 hours at 300 rpm. The mixture was then allowed to cool to room temperature and a dispersion of particles was obtained with a solid content of approximately 9% by weight. The dispersions were then centrifuged at 4800 rpm for 5 minutes. The supernatant was then decanted and sediments were collected. The sediments were then derived under vacuum at approximately 50° C. overnight to generate loose, well dispersed dried powders.

Example 6

Test composition 1 was prepared in accordance with the following procedure. A mixture of 75.5 g of a 40% solution of ammonium sulfate in water, 7.5 g of acrylamide, 12.0 g of a 20% solution of polydiallyldimethylammonium chloride in water, and 20.0 g of de-ionized water was prepared in a 250 mL three-neck, flask equipped with a condenser and a mechanical stirrer. The mixture was purged with nitrogen gas for 30 minutes and then heated to 35° C. A 5.0 g solution of 2,2'-azobis[2-(2-imidazolin-2-yl)propane]dihydrochloride in water (0.01% 2,2'-azobis[2-(2-imidazolin-2-yl)propane]dihydrochloride by weight) was then injected into the mixture. The mixture was then kept at 35° C. under nitrogen and stirred for 22 hours at 300 rpm. The mixture was then allowed to cool to room temperature and a dispersion of particles was obtained with a solid content of approximately 9% by weight.

Example 7

Test composition 2 was prepared in accordance with the following procedure. A mixture of 75.5 g of a 40% solution of ammonium sulfate in water, 7.5 g of acrylamide, 12.0 g of a 20% solution of polydiallyldimethylammonium chloride in water, 6.7 µL of poly(ethylene glycol)diacrylate, and 20.0 g of de-ionized water was prepared in a 250 mL three-neck flask equipped with a condenser and a mechanical stirrer. The mixture was purged with nitrogen gas for 30 minutes and then heated to 35° C. A 5.0 g solution of 2,2'-azobis[2-(2-imidazolin-2-yl)propane]dihydrochloride in water (0.01% 2,2'-azobis[2-(2-imidazolin-2-yl)propane]dihydrochloride by weight) was then injected into the mixture. The mixture was then kept at 35° C. under nitrogen and stirred for 22 hours at 300 rpm. The mixture was then allowed to cool to room temperature and a dispersion of particles with a solid content of approximately 9% by weight was obtained.

Example 8

Test composition 3 was prepared in accordance with the following procedure. A mixture of 90.0 g of a mixture of t-butanol and water (90% t-butanol by weight), 15.0 g of acrylamide, 0.50 g of poly(vinyl pyrrolidone), was prepared in a 250 mL three-neck flask equipped with a condenser and a mechanical stirrer. The mixture was purged with nitrogen gas for 30 minutes and then heated to 65° C. A 5.0 g solution of azobisisobutyronitrile in ethanol (1% azobisisobutyronitrile by weight) was then injected into the mixture. After approximately 20 minutes a solution of 0.10 g of N,N'-ethylene-bis-acrylamide in 5.0 g of a mixture of t-butanol and water (90% t-butanol by weight) was injected into the mixture. The mixture was then kept at 65° C. under nitrogen and stirred for 22 hours at 300 rpm. The mixture was then allowed to cool to room temperature and a dispersion of particles with sizes from 10 µm to 300 µm was obtained with a solid content of approximately 13% by weight. The dispersions were then centrifuged at 4800 rpm for 5 minutes. The supernatant was then decanted and sediments were collected. The sediments were then derived under vacuum at approximately 50° C. overnight to generate loose, well dispersed dried powders.

Example 9

Test composition 4 was prepared in accordance with the following procedure. A mixture of 90.0 g of a mixture of t-butanol and water (90% t-butanol by weight), 15.0 g of acrylamide, 0.50 g of poly(vinyl pyrrolidone), was prepared in a 250 mL three-neck flask equipped with a condenser and a mechanical stirrer. The mixture was purged with nitrogen gas for 30 minutes and then heated to 65° C. A 5.0 g solution of azobisisobutyronitrile in ethanol (1% azobisisobutyronitrile by weight) was then injected into the mixture. After approximately 20 minutes a solution of 0.40 g of N,N'-ethylene-bis-acrylamide in 5.0 g of a mixture of t-butanol and water (90% t-butanol by weight) was injected into the mixture. The mixture was then kept at 65° C. under nitrogen and stirred for 22 hours at 300 rpm. The mixture was then allowed to cool to room temperature and a dispersion of particles was obtained with a solid content of approximately 13% by weight. The dispersions were then centrifuged at 4800 rpm for 5 minutes. The supernatant was then decanted and sediments were collected. The sediments were then derived under vacuum at approximately 50° C. overnight to generate loose, well dispersed dried powders.

Example 10

Test composition 5 was prepared in accordance with the following procedure. A mixture of 90.0 g of a mixture of t-butanol and water (90% t-butanol by weight), 15.0 g of acrylamide, 0.50 g of poly(vinyl pyrrolidone), was prepared in a 250 mL three-neck flask equipped with a condenser and a mechanical stirrer. The mixture was purged with nitrogen gas for 30 minutes and then heated to 65° C. A 5.0 g solution of azobisisobutyronitrile in ethanol (1% azobisisobutyronitrile by weight) was then injected into the mixture. After approximately 20 minutes a solution of 0.20 g of N,N'-ethylene-bis-acrylamide in 5.0 g of a mixture of t-butanol and water (90% t-butanol by weight) was injected into the mixture. The mixture was then kept at 65° C. under nitrogen and stirred for 22 hours at 300 rpm. The mixture was then allowed to cool to room temperature and a dispersion of particles was obtained with a solid content of approximately 13% by weight. The dispersions were then centrifuged at 4800 rpm for 5 minutes. The supernatant was then decanted and sediments were collected. The sediments were then derived under vacuum at approximately 50° C. overnight to generate loose, well dispersed dried powders.

Example 11

Test composition 6 was prepared in accordance with the following procedure. A mixture of 90.0 g of a mixture of t-butanol and water (90% t-butanol by weight), 15.0 g of acrylamide, 0.50 g of poly(vinyl pyrrolidone), was prepared in a 250 mL three-neck flask equipped with a condenser and a mechanical stirrer. The mixture was purged with nitrogen gas for 30 minutes and then heated to 65° C. A 5.0 g solution of azobisisobutyronitrile in ethanol (1% azobisisobutyronitrile by weight) was then injected into the mixture. After approximately 20 minutes a solution of 0.050 g of N,N'-ethylene-bis-acrylamide in 5.0 g of a mixture of t-butanol and water (90% t-butanol by weight) was injected into the mixture. The mixture was then kept at 65° C. under nitrogen and stirred for 22 hours at 300 rpm. The mixture was then allowed to cool to room temperature and a dispersion of particles was obtained with a solid content of approximately 13% by weight. The dispersions were then centrifuged at 4800 rpm for minutes. The supernatant was then decanted and sediments were collected. The sediments were then derived under vacuum at approximately 50° C. overnight to generate loose, well dispersed dried powders.

Example 12

Test composition 7 was prepared in accordance with the following procedure. Equal amounts of the powders from Examples 8, 9, 10, and 11 were mixed to generate a powdered fluid loss control additive.

Example 13

Fluid loss tests were performed on test compositions 1-7 in accordance with the following procedure. Varying dosages of each of the test compositions as well as conventional fluid loss control additive N-Drill HT Plus® (commercially available from Halliburton Energy Services, Inc., Houston, Tex.) were added to separate drilling mud compositions comprising 0.09 g of viscosifier N-VIS® (commercially available form Halliburton Energy Services, Inc., Houston, Tex.), 14.0 g of bridging agent BARACARB® 5, (commercially available from Halliburton Energy Services, Inc., Houston, Tex.) 3.5 g of bridging agent CARACARB® 5 (commercially available from Halliburton Energy Services, Inc., Houston, Tex.), and 137 g of a 26% by weight solution of NaCl in water. The amount of NaCl in the drilling fluids that the fluid loss control additives from Examples 6 and 7 were added to was reduced to account for the brine present in those fluid loss control additives. The drilling fluids were each placed into a 175 mL "OFITE" HPHT Filter Press for fluid loss evaluation. In a typical experiment, pressures were adjusted to 600 and 100 psi (700 and 200 psi when the temperature is above 300° F.) on the top and bottom of a sample chamber, which was filled with mud and preheated to test temperature. Drained liquid, from a filter paper with a porosity of 2.7 μm sealed on the bottom of the cylinder, was collected. The performance of each fluid loss control additive is provided below in Table 1. The acceptable performance by an additive was set to be 10 mL volume of filtrate with 30 min test.

TABLE 1

| Fluid Loss Control Additive | Temperature (° F.) | Crosslinking Agent (wt %) | Dosage (wt %) | Fluid Loss (mL) |
| --- | --- | --- | --- | --- |
| N-DRILL HT PLUS ® | 250 | N/A | 2.0 | 9.5 |
| Test Composition 1 | 250 | 0 | 2.0 | 100 |
| Test Composition 2 | 250 | 0.006 | 2.0 | 4.3 |
| N-DRILL HT PLUS ® | 300 | N/A | 2.0 | 100 |
| Test Composition 2 | 300 | 0.006 | 2.0 | 100 |
| Test Composition 2 | 300 | 0.006 | 1.0 | 32 |
| Test Composition 2 | 300 | 0.006 | 0.5 | 37 |
| Test Composition 3 | 300 | 0.7 | 2.0 | 6.3 |
| Test Composition 3 | 300 | 0.7 | 1.0 | 16.3 |
| Test Composition 3 | 300 | 0.7 | 0.5 | 50.0 |
| Test Composition 3 | 350 | 0.7 | 2.0 | 40.0 |
| Test Composition 4 | 350 | 2.7 | 2.0 | 10.2 |
| Test Composition 5 | 350 | 1.3 | 2.0 | 7.5 |
| Test Composition 6 | 350 | 0.3 | 2.0 | 43.5 |
| Test Composition 7 | 350 | 1.3 | 2.0 | 6.5 |

In some embodiments, the present invention provides a method comprising: providing an aqueous based treatment fluid comprising a fluid loss control additive that comprises at least one polymeric micro gel; placing the aqueous based treatment fluid in a subterranean formation via a well bore penetrating the subterranean formation; allowing the fluid loss control additive to become incorporated into a filter cake located on a surface within the subterranean formation; allowing the filter cake to be degraded; and producing hydrocarbons from the formation.

As can bee seen by Table 1, test composition 1 which represented a liner high molecular weight polymer did not show effectiveness as nearly all fluid drained out. Test composition 2 (in brine solution) was found to perform better than N-Drill HT Plus® (fluid loss of 4.3 mL compared to a fluid loss of 9.5 mL) at the same dosage at 250° F. However, when tested at 300° F., both test composition 2 and N-DRILL HT Plus® nearly failed completely during the test at a dosage of 2 weight percent. Test composition 2 was able to reduce fluid loss to 32 mL and 37 mL at a dosage of 1 weight percent and 0.5 weight percent, respectively.

At 300° F., test composition 3 (crosslinking agent content of approximately 0.7 weight percent) controlled fluid loss around 6.3 mL, however this additive failed to meet the criteria of acceptable performance of 10 mL volume of filtrate within 30 minutes at 350° F. Test compositions 5 and 7 (crosslinking agent content of approximately 1.3 weight percent) were able to control the fluid loss around 7.5 and 6.5 mL at 350° F., respectively. However, increasing the crosslinking agent content to 2.7 weight percent (as demonstrated by composition 4) resulted in fluid loss of 10.2 mL.

As can be seen by Table 1, and further demonstrated by FIG. 3, dosage has an effect on the fluid loss control. As shown in FIG. 3, the fluid loss by test composition 3 decreased from 50 mL to 6.3 mL as the dosage of this additive increased from 0.5 wt percent to 2.0 weight percent. Thus, it is highly likely that the fluid loss would be further reduced at dosages higher than 2.0 weight percent, even though an optimal dosage might exist.

As can further be seen by Table 1, the filtrate volume decreased from 43.5 mL to 7.5 mL, when the crosslinking agent content of the corresponding fluid loss additive increased from 0.3 weight percent to 1.3 weight percent (See test compositions 6, 3, and 5). With a further increase of the crosslinking agent content to 2.7 weight percent (see test composition 4), the filtrate volume increased slightly to 10.2 mL. Surprisingly, synergist effect was observed when a mixture was used as the additive (See test composition 7). The mud containing this additive led to a fluid loss of only 6.5 mL, lower than those by any other non-mixed test compositions and well below the acceptable value of 10 mL. Without wishing to be limited to theory, it is believed that the synergy was probably due to the physical distribution of the polymeric micro gel particles in the mud, which enhanced the fluid loss reduction.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method comprising:
   providing a treatment fluid comprising an aqueous base fluid and a fluid loss control additive,
   wherein the fluid loss control additive comprises a polymeric micro gel and a continuous medium,
   wherein the continuous medium comprises a solvent selected from the group consisting of a polyglycol amine, a mixture of t-butanol and water, and any combination thereof;
   placing the treatment fluid in a subterranean formation via a wellbore penetrating the subterranean formation; and
   allowing the fluid loss control additive to become incorporated into a filter cake located on a surface within the subterranean formation.

2. The method of claim 1, further comprising:
   allowing the filter cake to be degraded.

3. The method of claim 1, wherein the fluid loss control additive is included in the treatment fluid in an amount greater than 0% and up to about 5% by weight of active component of the polymeric micro gel.

4. The method of claim 1, wherein the polymeric micro gel has a diameter range of about 10 nm to about 1 mm.

5. The method of claim 1, wherein the continuous medium further comprises a co-solvent selected from the group consisting of fresh water, sea water, salt water, brine, methanol, ethanol, n-propanol, n-butanol, sec-butanol, isobutanol, isopropanol, a polyol, a glycol, a mixture of sodium chloride and water, a mixture of potassium chloride and water, a mixture of calcium chloride and water, a mixture of ammonium sulfate and water, a mixture of sodium sulfate and water, a mixture of potassium sulfate and water, a mixture of methanol and water, a mixture of ethanol and water, a mixture of n-propanol and water, a mixture of n-butanol and water, a mixture of sec-butanol and water, a mixture of isobutanol and water, and any combination thereof.

6. The method of claim 1, wherein the treatment fluid further comprises a bridging agent.

7. The method of claim 1, wherein the treatment fluid does not comprise a clay.

\* \* \* \* \*